Dec. 26, 1939.  A. JENNY ET AL  2,184,599
PHOTOGRAPHIC REPRODUCTION
Filed Jan. 18, 1936
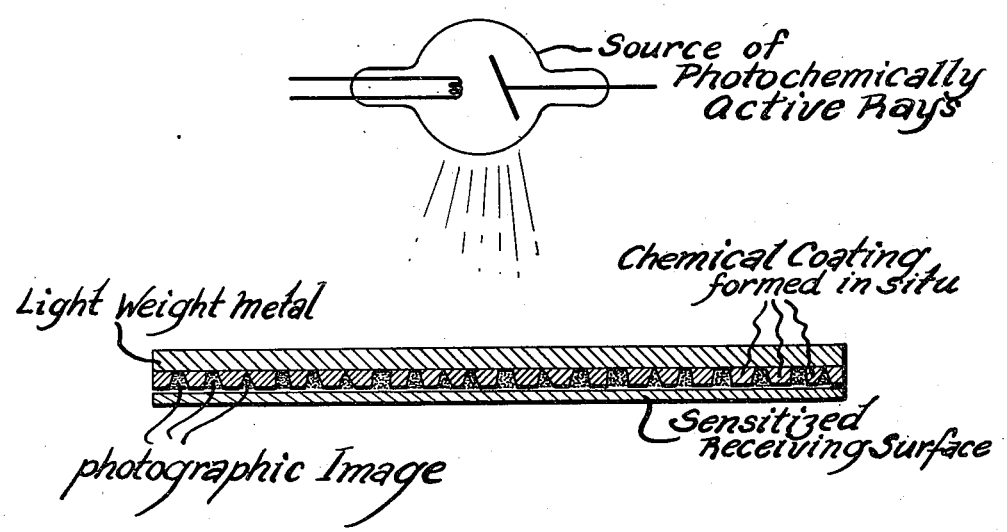
Inventors,
Alexander Jenny, Nikolai Budiloff,
Hans Becker & Kurt Anton
By: Henry C. Parker  Atty.

Patented Dec. 26, 1939

2,184,599

UNITED STATES PATENT OFFICE 2,184,599

PHOTOGRAPHIC REPRODUCTION

Alexander Jenny, Berlin-Charlottenburg, Nikolai Budiloff, Berlin-Friedenau, Hans Becker, Berlin-Siemensstadt, and Kurt Anton, Berlin-Charlottenburg, Germany Application January 18, 1936, Serial No. 59,786
In Germany February 10, 1933

6 Claims. (Cl. 250—65)

This invention relates to photographic reproductions; and it comprises a method of reproducing images from metallic films or plates wherein a thin sheet of a light-weight metal, carrying an image having a density different from that of said metal and usually comprising a metal having an atomic weight higher than that of silver, is interposed between a source of metal-penetrating rays and a receiving surface sensitive to such rays, the latter surface being then developed and fixed by usual methods; all as more fully hereinafter set forth and as claimed.

The present application is a continuation-in-part of our copending application, Ser. No. 710,370, filed February 8, 1934. Our prior application describes a method of producing images upon metallic films having surfaces of aluminum or of aluminum alloys by producing what we have termed "grown layers" of aluminum compounds on said metallic films, the said layers being impregnated with photo-sensitive materials, then exposed, developed and fixed by usual methods. This prior application is directed more particularly to the production of grown layers, that is, layers formed in situ on said metal films, of particular composition and to methods of annealing said layers to render the same flexible. The present application is directed more particularly to the reproduction of the images which have been formed upon such metallic films and plates either by the methods described in our acknowledged application or by other methods.

Photographic images were at first produced almost exclusively upon metallic surfaces. Metallic photographic plates are still in use to some extent, for example in the so-called "tin type." While metallic films have also been produced in the art the use of such films has never been practiced commercially owing to the seeming impossibility of obtaining satisfactory adhesion of the image-carrying layer upon a metal surface subject to bending. The use of metal surfaces for photographic purposes has, in the past, been delayed by the not inconsiderable disadvantage that no completely satisfactory method has hitherto been developed for the reproduction of images formed upon such surfaces. The present invention provides a solution for this problem.

We have found that an image on a metallic film or thin metal plate can be reproduced in a manner similar to the method now commonly employed for the reproduction of images from transparent plates and films simply by the substitution of X-rays or other photochemically-active, metal-penetrating rays for the source of light used in the common method; that is, the metal plate or film carrying the image to be reproduced is simply interposed between a source of X-rays, for example, and a surface sensitive to these rays, the metal being substantially transparent to these rays, while the image permits passage of the rays roughly in proportion to its density.

We have found that there is sufficient difference in density between a silver or other heavier metal image and a light weight metal (usually called "light-metal") film or plate in order to produce satisfactory contrast or definition in the image obtained by this method. This was highly surprising in view of the extremely small quantity of silver present in the usual photographic image and in view of the fact that the light-metal plate or film itself is not fully transparent to the rays employed in the present invention. It is also true, of course, that the rays used are capable of penetrating silver and other metals to some extent. At first sight our method would therefore appear comparable to the attempt to reproduce by ordinary methods an image from a film of semi-translucent material, an operation which would be difficult if not impossible.

In our reproduction method it is possible to employ any metal penetrating rays which produce a photochemical effect, the receiving surface being sensitive to these rays. Examples of such rays are X-rays, cathode rays and radio-active rays, for example.

It is important that the image to be reproduced be transposed directly over the sensitive surface and that a point source of rays or parallel rays be employed. Otherwise the definition of the reproduced image will be impaired. In these respects the present method is directly comparable to the known method of reproducing images from transparent films and plates. It is of course desirable to employ an intense and penetrating source of rays in order that the time of exposure may be shortened. In this connection the high voltage X-ray tubes which have been developed within the past few years have been found highly satisfactory.

Our invention appears to be particularly adapted for use with the aluminum films of our acknowledged application. It is also possible, however, to employ the present method with light metals and light metal alloys other than aluminum, such as zinc and magnesium for example. Aluminum alloys, such as duralumin and lautal, may be employed.

In our acknowledged application we have described several methods of producing grown layers upon aluminum and aluminum alloy surfaces. In these methods a firmly adherent porous layer of an aluminum compound is formed on the surface of the metal by chemical treatment of the surface. A suitable chemical treatment may consist simply of dipping an aluminum plate or film into a solution of a substance such as a caustic alkali, capable of forming a layer of aluminum oxide on the surface, or the metal may be treated anodically in an acid, such as sulfuric, chromic, etc. The metal may be treated by dipping it into a molten salt bath or an oxide layer may be formed simply by heating the metal under controlled conditions, with or without a previous chemical treatment. When aluminum is employed as the metal, grown layers may be obtained of aluminum oxide, fluoride, oxalate, silicate, phosphate, etc. These grown layers form the carrier or support for the light-sensitive materials. The particular manner in which the grown layers are formed on the metal film or plate forms no part of the present invention.

The manner in which the film or plate is impregnated by light sensitive salts is likewise immaterial to the present invention. Many methods for doing this are known and several are described in our acknowledged application. Thus, the grown layer may be dipped into successive solutions, such as silver nitrate and potassium bromide, which are capable of reacting to precipitate a light sensitive silver salt within the pores of said grown layer. The grown layer may be impregnated with a molten light sensitive salt. Or the grown layer may simply be coated with one of the usual photographic emulsions of gelatine, collodion or albumin, for example, in which case the emulsion will penetrate into the pores of the grown layer, firmly keying thereto. Impregnation may be by spraying, dipping or flowing the solutions over the surface of the grown layer. It is also possible, for the purposes of the present invention, to employ light metals without a grown layer but which have been simply coated with a light-sensitive emulsion by known methods. The present invention affords a method whereby images carried by light-metal films and plates can be reproduced by methods wherein rays are transmitted through the films or plates, in contrast to methods wherein reproduction is obtained by use of light reflected from the films or plates.

The present method depends for its success upon the difference in density between the light-metal film or plate and the image carried thereby. Speaking more strictly it depends upon the difference in permeability to the rays which are employed for reproducing purposes. The greater the difference in permeability, the better the reproduction, other factors remaining equal. Methods which tend to increase the difference in permeability between the plate or film, and the image are of great advantage in our process in improving the reproduction.

We have found that the usual photographic images of silver can be treated by any of the intensifying or toning methods known in the photographic art with great improvement in their reproduction. In these toning methods the silver of the image is usually at least partly replaced by an equivalent amount of metal of higher atomic weight, such as gold or platinum, for example. This replacement results in a greater difference of permeability for the rays employed in the present invention.

To produce gold toning the plate or film carrying the silver image may be dipped into a solution of sodium chloraurate. In platinum toning a solution of potassium chloroplatinite may be used. Even better results are obtained by converting the silver images into lead, mercury or uranium negatives. This can be accomplished by the use of solutions of the nitrates of these metals. In order to produce an improved result the metal substituted for the silver should be of higher atomic weight. Any heavy metal can be employed, of this nature.

Other intensifying methods may be employed which result in increasing the difference between the permeabilities of the plate or film and the image carried thereby. We have found, for example, that the light-metal plates or films, carrying images, can be flash-coated by electrolytic processes with an improvement in reproduction. This is apparently due to a preferential deposition of the metal upon the image. This preferential deposition is particularly marked in those cases where the image is imbedded in a grown layer. If desired a silver coating bath may be employed but the heavier the metal deposited the greater the effect produced.

Another intensifying method of advantage in our invention consists in etching the surface of the plate or film, using a solution which has a preferential solubility for the metal of the plate or film. A solution of a hot caustic alkali can be used for example. Such a solution will dissolve part or all of the grown layer and to some extent the metal lying beneath it, leaving the metal image itself substantially intact. The solution of any chemical which is substantially inert towards the image but which will dissolve the light-metal is satisfactory. It is possible, of course, to combine toning methods with subsequent etching or flash-coating processes with advantageous results. These various intensifying methods constitute an important step in the process of the present invention.

It is true, of course, that the negatives used in our invention do not need to be metallic. Thus, it is possible to employ negatives consisting of metallic compounds such as lead sulfide, lead chloride, lead sulfate, etc. by methods which have been previously suggested in the art.

While X-rays have been used in the art to detect flaws in metallic castings, for reproducing the graining of a piece of wood and for other similar purposes, it has never been proposed to reproduce images from metallic films and plates in this fashion, in spite of an important demand for suitable methods for accomplishing this result. This fact indicates the surprising nature of the results which we have obtained.

Our invention can be described in somewhat greater detail by reference to the accompanying drawing which shows, more or less diagrammatically, one way in which our process can be conducted. The drawing is provided with descriptive legends which are believed to make it self-explanatory. The light-weight metal sheet and the chemical coating on this sheet are shown on a greatly enlarged scale in order that the porous nature of the coating may be illustrated. The photographic image is shown imbedded in the pores of the coating. An X-ray tube is shown as the source of photochemically active rays. The sensitized receiving surface is shown beneath the metal sheet in position ready to be exposed to the X-rays passing through the metal sheet and through the photographic image carried thereby.

In a specific embodiment of the present invention which represents a practical operation, we coated an aluminum film with an oxide coating by passing the same through a bath containing from 5 to 10 per cent chromic acid, the film being connected to one terminal of a 110 volt source of alternating current while the other terminal was connected to an aluminum plate immersed in the bath. After washing, the oxide coating thus formed on the film was impregnated with light sensitive salts by immersing the same first into a 10 per cent solution of potassium bromide and then into a 10 per cent solution of silver nitrate. The excess of silver nitrate was removed by rinsing several times and the sensitized film was then dried. The film so made was exposed in the usual way in a camera and was then developed and fixed, also by usual methods. The film was then dipped into a normal gold salt bath for 3 minutes, rinsed and dried. This latter operation was for the purpose of intensifying the image.

The image upon the metal film was then reproduced upon one of the usual Celluloid photographic films by laying the metal film, image side down, on top of the Celluloid film which had its emulsion side upwards. The so-assembled films were placed directly beneath a high-voltage X-ray tube which was operated for 5 seconds. The Celluloid film was then removed, developed and fixed by usual methods. The image on this film was found to be clearly defined and to have sufficient contrast for all purposes.

The method of the present invention appears particularly adapted to the reproduction of metal films employed as permanent records. Photographic images produced in grown layers upon light metal plates or films are highly durable. They do not deteriorate with age and are capable of withstanding elevated temperatures without harm. These films or plates can now be reproduced with a minimum of handling and without damage.

It is evident, of course, that our method is subject to many variations within the ordinary skill of the art. The reproduction of our invention can be made upon the ordinary transparent films, upon other metal films or upon sensitized paper. While it is desirable to intensify the image by one of the methods outlined above this is not essential since silver images can be satisfactorily reproduced without alteration. If desired two or more grown layers may be employed. These may be of different composition. For example an oxide layer may be coated with a fluoride layer or a phosphate layer. These coatings key well to each other and are sufficiently porous to be readily impregnated with the light sensitive salts. Developing, fixing, etc., of the images employed in our invention may follow usual practices in the photographic art. Other modifications which fall within the scope of the following claims will be immediately evident to those skilled in the art.

What we claim is:

1. The process of making and reproducing photographic images on plates and films of light-weight metals which comprises producing a chemical coating on a thin sheet of a light-weight metal, said coating consisting substantially of a chemical compound of said metal, impregnating said coating with a photochemically active material, converting said material into a photographic image of variable density, then reproducing said photographic image by interposing said sheet between a source of X-rays and a receiving surface sensitive to such rays, said photographic image being composed of a material substantially less permeable to X-rays than said light-weight metal.

2. The process of claim 1 wherein said light-weight metal is aluminum and the chemical coating consists substantially of aluminum oxide.

3. The process of claim 1 wherein said photographic image is treated, prior to the reproduction step, with intensifying chemicals adapted to decrease the permeability of said image to X-rays.

4. The process of claim 1 wherein said photographic image is of silver, said image being flash-coated with a metal having an atomic weight higher than that of silver prior to the reproduction step.

5. The process of making and reproducing photographic images on plates and films of aluminum and aluminum alloys of light weight, which comprises producing an anodic coating consisting substantially of a compound of aluminum on a thin sheet of such a material, impregnating said anodic coating with photochemically active silver salts, converting said silver salts into a silver photographic image of variable density, then reproducing said photographic image by interposing said sheet between a source of X-rays and a receiving surface sensitive to such rays.

6. In the process of making photographic reproductions on plates and films of aluminum and aluminum alloys of light weight, wherein a thin sheet of such a material is coated anodically with a film consisting substantially of an aluminum compound, the film is impregnated with photochemically active silver salts and the silver salts are then converted into a silver photographic image of variable density; the improvement which comprises subjecting said photographic image to a chemical treatment decreasing its permeability to X-rays and then reproducing the resulting intensified image by interposing said sheet between a source of X-rays and a receiving surface sensitive to such rays.

ALEXANDER JENNY.
NIKOLAI BUDILOFF.
HANS BECKER.
KURT ANTON.